United States Patent
Westerberg

[19]
[11] Patent Number: 6,058,302
[45] Date of Patent: May 2, 2000

[54] LIMITING ACCESS TO PRIVATE NETWORKS IN CELLULAR COMMUNICATIONS SYSTEMS

[75] Inventor: Erik Westerberg, Hägersten, Sweden

[73] Assignee: Telefonaktiebolaget L M Ericsson (publ), Stockholm, Sweden

[21] Appl. No.: 08/932,118

[22] Filed: Sep. 17, 1997

[51] Int. Cl.[7] .................................................. H04M 3/16
[52] U.S. Cl. ........................ 455/411; 455/426; 455/448
[58] Field of Search .................................. 455/426, 439, 455/443, 444, 435, 436, 434, 515, 516, 525, 465, 462, 445, 437, 517, 524, 448, 410, 411, 454; 370/331, 338

[56] References Cited

U.S. PATENT DOCUMENTS

| | | | |
|---|---|---|---|
| 5,274,368 | 12/1993 | Breeden et al. | 340/825.31 |
| 5,345,499 | 9/1994 | Benveniste | 379/59 |
| 5,345,502 | 9/1994 | Rothenhofer | 379/207 |
| 5,640,677 | 6/1997 | Karlsson | 455/33.2 |
| 5,768,267 | 6/1998 | Raith et al. | 370/329 |
| 5,778,075 | 7/1998 | Haartsen | 380/49 |
| 5,884,145 | 3/1999 | Haartsen | 455/63 |
| 5,887,256 | 3/1999 | Lu et al. | 455/426 |
| 5,890,064 | 3/1999 | Widergen et al. | 455/445 |

FOREIGN PATENT DOCUMENTS

| | | | |
|---|---|---|---|
| 9709835 | 3/1997 | WIPO | H04Q 7/22 |
| 9715168 | 4/1997 | WIPO | H04Q 7/38 |

*Primary Examiner*—Lee Nguyen
*Assistant Examiner*—Isaak R. Jama
*Attorney, Agent, or Firm*—Jenkens & Gilchrist, P.C.

[57] ABSTRACT

A mobile cellular communications system and method are disclosed, which limit access of private network cells only to mobile subscribers of those private networks. In cells belonging to the public network, only information about the public cells is broadcast on the public system information control channels. This public cell information is thus the only cell information that the non-subscribers' terminals are able to receive. When a mobile terminal belonging to a subscriber of one or more private networks surfaces in a public cell, the public network transmits a radio link control message to that mobile terminal, which contains information about the candidate cells for selection associated with the private network(s). The private network transmits system information via the private cell to a subscribing mobile terminal about the private and public cells' neighboring cells. Consequently, the subscribing mobile terminal will regard the public network cells and private network cells as integral parts of the overall cellular system.

27 Claims, 3 Drawing Sheets

LIMITING ACCESS TO PRIVATE NETWORKS IN CELLULAR COMMUNICATIONS SYSTEMS

BACKGROUND OF THE INVENTION

1. Technical Field of the Invention

The present invention relates in general to the mobile communications field and, in particular, to a method for limiting access to private cellular networks.

2. Description of Related Art

In today's highly advanced cellular radio communications systems, there is a growing need for network operators to be able to differentiate between numerous sets of different end users. Consequently, in order to meet this growing need, operators are deploying a multitude of relatively small private and/or closed cellular sub-networks within the larger, public cellular networks. As such, the use of such private sub-networks allows the public network operators to guarantee selected sets of end users a specified quality of service. Similarly, only specific end users are allowed to access cells belonging to the closed sub-networks. For example, an indoor radio network covering the offices of a particular business can be operated as a private or closed sub-network within a public cellular network. Consequently, only employees of that business would be allowed to access and use that indoor radio network.

Of crucial importance to the success of these new private and closed networks is that they can be readily integrated with public cellular networks. In particular, from the viewpoint of a private network subscriber, the overall system should appear to allow seamless handovers between the private and public networks' cells. Furthermore, it is also important to ensure that cellular users who are not subscribers to a private network (hereinafter "non-subscribers") should not be allowed to access (or even be aware of) the private network's cells.

FIG. 1 is a diagram that shows an exemplary mobile communications system, which provides radio coverage for mobile terminals (not explicitly shown) with a plurality of private network cells operating within an area covered by one or more macro-cells of a public cellular network. Hereinafter, for clarity, assume that a mobile end user can be a subscriber to a public and private network, but a "non-subscriber" is a mobile end user that does not subscribe to the private network(s) involved. Alternatively, hereinafter a "subscriber" is a mobile end user that subscribes to the private network(s) involved. In an actual operation, the public cellular network can comprise a plurality of macro-cells, micro-cells and/or pico-cells.

Specifically, for the exemplary mobile communications system shown in FIG. 1, in order for a user's mobile terminal to move from the public macro-cell 12 to any one of the private network cells 14, 16, 18 or 20, or from macro-cell 22 to private network cell 20, there has to be a neighboring-cell relationship defined between the macro-cell (12 or 22) and the respective private network cell (14, 16, 18 or 20). In addition, in order for a mobile terminal to move from a macro-cell to a private network cell, the mobile terminal must be able to "see" that private cell as a candidate for cell selection, and also be able to measure the signal strength of the base station transmitter that defines that private cell.

In certain mobile communications systems, such as, for example, the General Packet Radio Service (GPRS) of the digital cellular Global System for Mobile Communications (GSM), the mobile terminals are responsible for cell selection. Consequently, these mobile terminals must have access to all system parameters regarding which criteria to use for selecting a private cell while being located in a public macro-cell. As such, in such a system utilizing a hierarchical cell structure (HCS) with numerous private networks, there are large numbers of macro-cell neighbors, which creates the following problems.

First, in such conventional mobile communications systems as the GPRS, each corresponding set of cell selection parameters has to be broadcast on the control channel in the public macro-cell, which imposes an unnecessarily large load on that control channel. For example, in the GPRS, this unnecessarily large load is imposed on the Packet Broadcast Control Channel (PBCCH). As specified in the GSM Technical Specifications 03.64 and 05.08, there are 15 selection parameters associated with each neighboring cell, which corresponds to roughly 70 information bits. Consequently, since a load of roughly 700 information bits is a maximum acceptable load for the PBCCH, it is obvious that such a system operating with more than 10 neighbor cells will impose an unacceptable load on the PBCCH.

Second, in order to be able to cater to all of the conventional system's end users' needs, all available frequencies are broadcast over the Broadcast Control Channel (BCCH). Consequently, for cell selection purposes, the end users' terminals are required to make downlink signal strength measurements on all of those frequencies, including even those frequencies that correspond to private network cells which some (non-subscribing) users' terminals are unable to access. These unnecessary downlink signal strength measurements for non-subscribing terminals yields significantly low accuracies for measurements made on the other accessible cells.

Third, in such mobile communications systems as the GPRS, there is currently no means to communicate to any mobile terminal just what cells are accessible (public) and which are not (private). Consequently, even if the above-described problems were to be resolved, the existing systems provide no means to implement those solutions.

Another related problem found in conventional mobile communications systems is that private networks are made inaccessible to non-subscribing public end users in basically two ways. Either the private network is completely isolated from the public network, or the private network's cells are made part of the public network but marked with, for example, a "cell barred for public subscribers" flag in the broadcast system information given about those private cells. Obviously, a significant problem with totally isolating the private network from the public network is that no handovers can be made from a cell in the private network to a cell in the public network, or vice versa. Also, a significant problem with using the "cell barred" flag method is that all of the mobile terminals involved can "see" all of the available cells, including those cells which are inaccessible. In conventional mobile communications systems, the above-described problems lead to an unnecessary use of processing resources, less time available for mobiles to perform downlink measurements on true handover cell candidates, and/or unacceptably large loads imposed on the public network's control channels. However, as described below, these problems are successfully resolved by the present invention.

SUMMARY OF THE INVENTION

It is, therefore, an object of the present invention to provide a mobile cellular communications system and method by which private network cells can be kept hidden from non-subscribing mobile terminals.

It is another object of the present invention to provide a mobile cellular communications system and method by which non-subscribing mobile terminals are not required to waste processing resources and time making downlink signal strength measurements for inaccessible private network base stations.

It is yet another object of the present invention to provide a mobile cellular communications system and method by which the downlink signal strength measurement accuracy for the public network can be significantly increased.

It is also an object of the present invention to provide a mobile cellular communications system and method by which a non-subscribing mobile terminal is unable to re-select cells associated with selected private networks.

It is a further object of the present invention to provide a mobile cellular communications system and method by which the transmission of private network information does not impose an unnecessary load on a public system's control channels.

It is still another object of the present invention to provide a mobile cellular communications system and method by which a subscribing mobile terminal can regard a private network as a fully integrated part of the public system, in order to be able to fully use such features as handovers between cells, or HCS features for prioritizing the use of cells.

In accordance with the present invention, the foregoing and other objects are achieved by a mobile cellular communications system and method that limits access to private network cells only to subscribing mobile terminals. In cells belonging to the public network, only public cell information is broadcast on the public system information control channels. This public cell information is thus the only cell information that a non-subscribing mobile terminal can receive. When a mobile terminal belonging to a subscriber of one or more private networks surfaces in a public cell, the public network transmits a radio link control message to that mobile terminal, which contains information about the candidate cells for selection associated with the private network(s) involved. The private networks transmit system information via the private cells to subscribing mobile terminals about the private and public cells' neighboring cells. Consequently, the subscribing mobile terminals can regard the public network cells and private network cells as integral parts of the overall system. Cells associated with private networks to which a mobile terminal's end user is a non-subscriber are thus "invisible" to that mobile terminal.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–3C of the drawings, like numerals being used for like and corresponding parts of the various drawings.

Essentially, in cells belonging to the public network, only the public cell information is broadcast on the public system information channel (e.g., PBCCH for GPRS). This is the only information that mobile terminals of non-subscribers to the private networks can receive. Consequently, from the viewpoint of these non-subscribing terminals, it appears that the private cells do not exist. However, when a subscribing mobile terminal surfaces in a public cell, it transmits identifying information to the public network. The public network accesses a database (e.g., a Home Location Register) and determines that mobile terminal's end user is a subscriber to one or more private networks. The public network sends a control message to that mobile terminal which contains cell selection candidate information about the one or more private network's cells. That mobile terminal can then consider both the private and public cells for cell re-selection.

Figure 1:
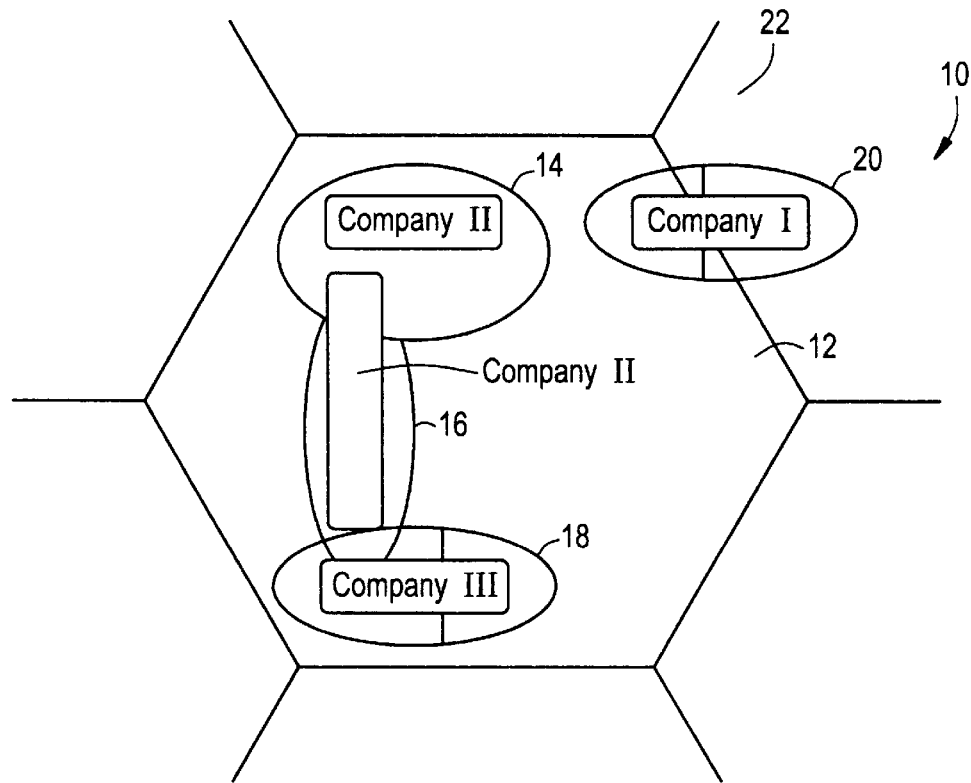
FIG. 1 is a diagram that shows an exemplary mobile communications system, which provides radio coverage for mobile terminals with a plurality of private network cells operating within an area covered by one or more macro-cells of a public cellular network.
Figure 2:
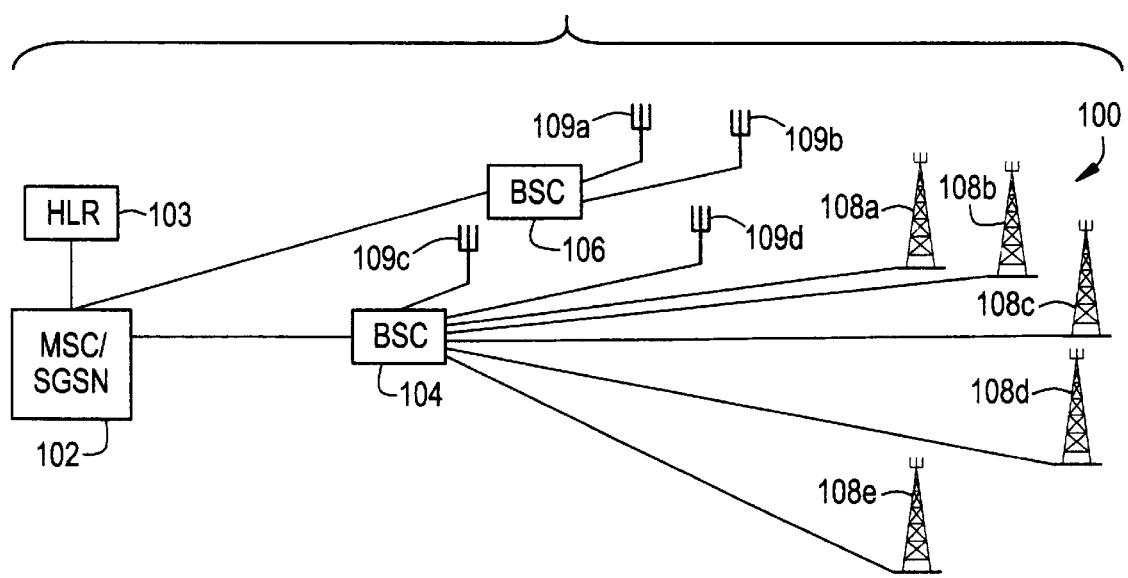
FIG. 2 is a block diagram of an exemplary cellular communications system, which can be used to implement a method of the present invention.

Specifically, FIG. 2 is a block diagram of an exemplary cellular communications system, which can be used to implement a method of the present invention. For the preferred embodiment, the cellular communications system shown in FIG. 2 can be operating in accordance with the GPRS radio interface protocol (e.g., GSM Technical Specification 04.60 published by the European Telecommunications Standards Institute). Referring to FIG. 2, public (GPRS) network 100 includes a mobile services switching center/serving GPRS support node (MSC/SGSN) 102, which controls calls to and from other telephony and data communications systems (e.g., Public Switched Telephone Network or PSTN, Integrated Services Digital Network or ISDN, Public Land Mobile Network or PLMN, Public Data Networks or PDN, or even private networks). Network 100 also includes at least one Base Station Controller (BSC) 104 or 106, which is served by the MSC/SGSN 102. The BSC 104 controls a plurality of Base Transceiver Stations (BTSs) 108a–108e and such functions as handovers and channel assignments. Each BTS 108a–108e operates on a set of radio channels and defines a public macro-cell.

Each of a plurality of private radio network transceivers 109a–109d operates on its respective radio channels and defines a private network cell (e.g., a plurality of micro- and/or pico-cells). The plurality of private radio network transceivers 109a–109d can be controlled by one or more BSCs (e.g., 104 and/or 106). A plurality of public and private network cells, which are defined by the public and private transceivers shown in FIG. 2, are illustrated by FIGS. 3A–3C.

Figure 3A:
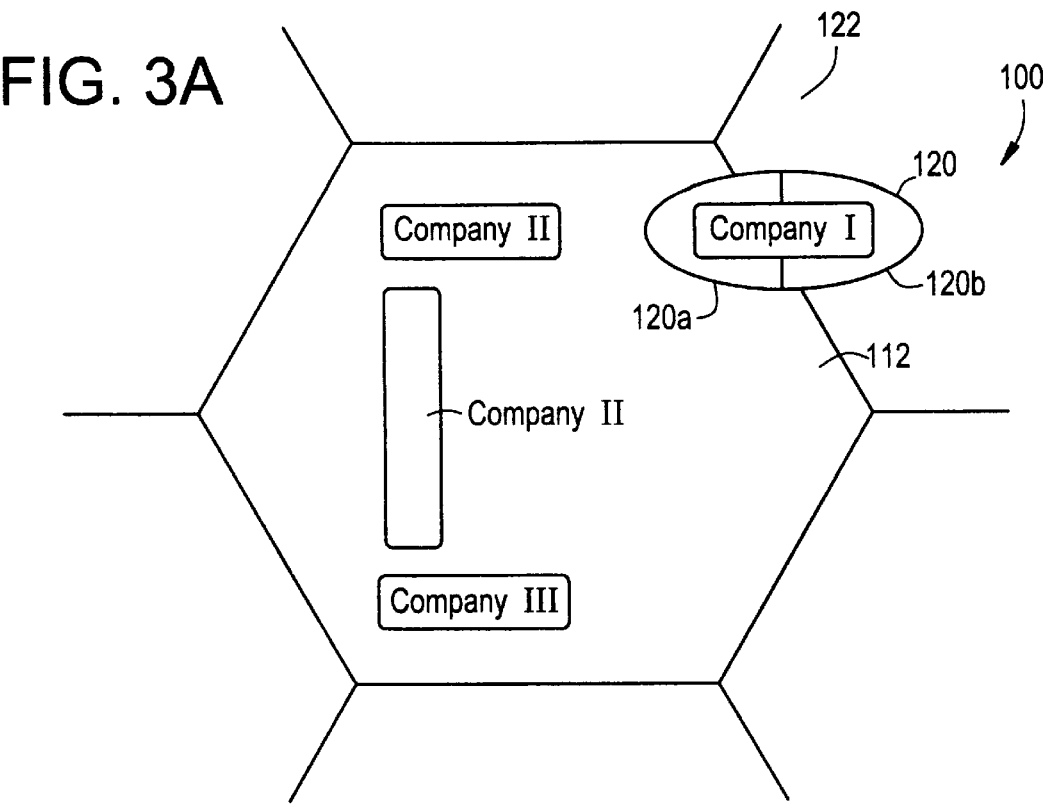
FIGS. 3A–3C are diagrams that illustrate what a subscribing mobile terminal "sees" in a geographical area covered by a plurality of public and private network cells defined by the radio transceivers shown in FIG. 2, in a mobile communications system that is implemented in accordance with the preferred embodiment of the present invention.
Figure 3B:
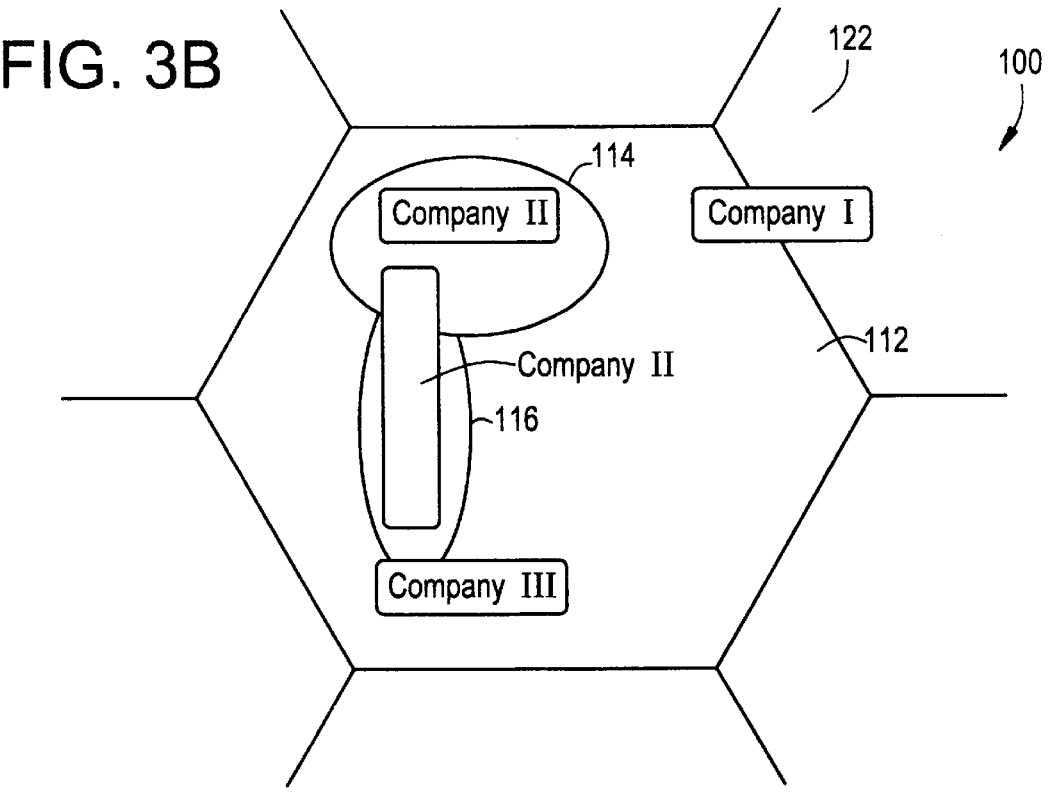
Figure 3C:
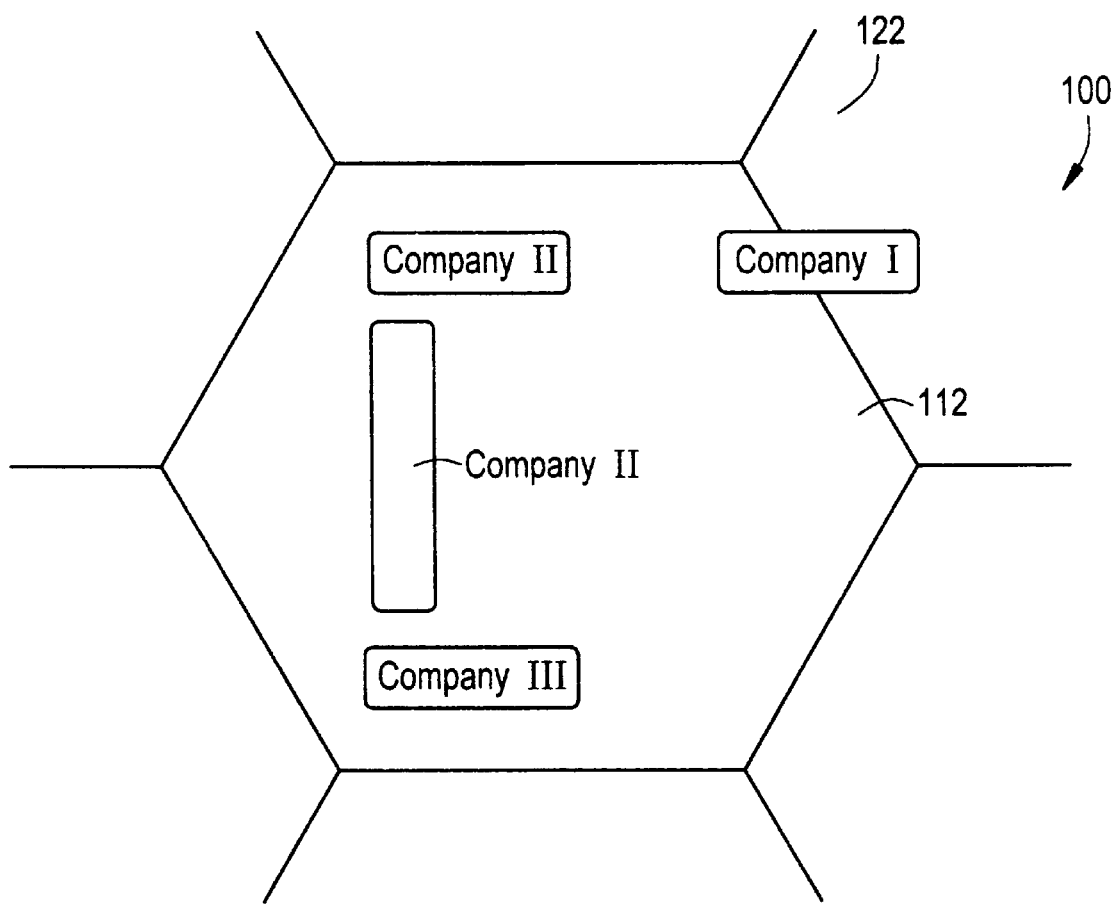

FIGS. 3A–3C are diagrams that illustrate what a subscribing mobile terminal "sees" in geographical areas covered by the plurality of public and private network cells defined by the radio transceivers shown in FIG. 2, in a mobile communication system that is implemented in accordance with the preferred embodiment of the present invention. For this exemplary embodiment, the public network 100 shown is a GPRS network. Public network 100 includes a plurality of public macro-cells (e.g., at least neighboring cells 112 and 122), each of which is defined by one of the BTSs 108a–108e shown in FIG. 2. FIGS. 3A–3C also show a plurality of private network cells 114, 116 and 120, each of which is defined by a respective one of the private radio network transceivers 109a, 109b, 109c or 109d. Private network cells 114, 116 and 120 can be micro-cells, pico-cells, or cells in an HCS including any appropriate private network cell structure.

FIG. 3A is a diagram that illustrates what a mobile terminal "sees" when it is used by a subscriber of a private network including a transceiver 109a, which defines cell 120 to cover the premises of Company I. Notably, as shown in this example, the subscribing mobile terminal can communicate with BSC 104 and MSC/SGSN 102 via the radio interfaces of the public cells (e.g., 112, 122) and private cell 120. Since, in this example, that particular mobile terminal's user does not subscribe to any other private networks, only the private network associated with cell 120 can be communicated with or "seen" by that subscribing mobile terminal. Consequently, for example, if that subscribing mobile terminal is located in, and actively communicating with MSC/SGSN 102 via, public cell 122, then that subscribing mobile terminal will be able to consider both public cell 112 and private cell 120 for cell re-selection should it move to the coverage area of one of those cells.

For this embodiment, a method of limiting access to private networks for private network subscribers can be implemented in part by barring the broadcasting of any private network information over the public network's information channel (e.g., PBCCH for the GPRS). However, when a mobile terminal being used by a subscriber of a private network surfaces in a public cell (e.g., the mobile transmits a conventional cell update request message or uplink initiation transfer message in public cell 112 or 122), the public network (e.g., GPRS network) 100 transmits a radio link control message for that mobile terminal preferably over the Packet Associated Control Channel (PACCH). That transmitted radio link control message is preferably a signaling block message, which contains information about the cell selection candidate cells associated with the private network involved. For the private network cell 120, the radio link control message transmitted to that mobile terminal can include selection candidate information about public cells 112 and 122. For example, in a GPRS system, such a radio link control message would contain cell selection information for the private cell 120. This information could include, but would not be limited to, information about cell identity (e.g., Base Station Identity Code or BSIC), priority class, temporary offsets to use, permanent offsets to use, signal strength thresholds, and more, as specified in the GSM Technical Specification 03.64. The mobile terminal stores this cell selection candidate information in an internal memory storage location for as long as that mobile terminal remains in that public cell. Consequently, the private network cell 120 appears to that subscribing mobile terminal to be an integral part of the public cellular radio network (e.g., GPRS network) 100. As such, that subscribing mobile terminal can consider the public cells 112 and 122 and private cell 120 for cell re-selection for as long as it remains in the original public cell (112 or 120). The private network broadcasts (preferably over the Broadcast Control Channel or BCH) in it's cells (e.g., cells 120a and 120b) pertinent system information about the private and public networks' neighboring cells. This action is to ensure that as long as the mobile terminal is located in the coverage area of the appropriate private or public cells, it will continue to regard the public cells and private cell (subscribed to) as an integral part of the overall network. Cells associated with the private networks to which that mobile terminal's end user does not subscribe (e.g., cells 114 and 116 in FIG. 3B described below) are thus "invisible" to that mobile terminal.

FIG. 3B is a diagram that illustrates another view of what a mobile terminal "sees" when it is used by a subscriber of a private network with transceivers 109b and 109c, which define respective private cells 114 and 116 to cover two different premises of Company II. As shown in FIG. 3B, the subscriber's mobile terminal can communicate with BSC 104 and MSC/SGSN 102 via the radio interfaces of public cell 112 and private cells 114 and 116. In this example, the method of limiting access to the private networks is again implemented in part by barring the broadcasting of any private network information over the public network's information channel (e.g., PBCCH for the GPRS). However, when a mobile terminal being used by a subscriber of the private networks covering the premises of Company II surfaces in public cell 112 (e.g., transmits a cell update request message or uplink initiation transfer message in public cell 112), the public network 100 transmits a radio link control block for that mobile terminal preferably over the PACCH. This transmitted signaling block message contains information about the cell selection candidate cells associated with the private network involved. For private network cells 114 and 116, the radio link control message transmitted to that subscribing mobile terminal can include selection candidate information about public cell 112. The mobile terminal stores this cell selection candidate information in an internal memory storage location for as long as it remains in that public cell. Consequently, the private network cells 114 and 116 appear to that subscribing mobile terminal as an integral part of the public cellular radio network (e.g., GPRS network) 100. As such, that mobile terminal can consider the public cell 112 and private cells 114 and 116 for cell re-selection for as long as it remains in public cell 112.

The private network broadcasts (preferably over the BCH) in cells 114 and 116 system information about the private and public networks' neighboring cells. The mobile terminal will thus regard the public cell and private cells (subscribed to) as part of the overall network. Cells associated with the private networks to which that mobile terminal's user does not subscribe (e.g., cell 120 in FIG. 3A described above) are thus "invisible" to that mobile terminal.

FIG. 3C is a diagram that illustrates another view of what a mobile terminal "sees" when it is used by a subscriber to only the public network 100. As shown, since the present method of limiting access to private networks is implemented in part by not broadcasting any private network information over the public network's information channel, that mobile terminal (a non-subscriber with respect to the private networks) is neither able to "see" nor communicate via any of the private network cells (e.g., cells 114, 116 or 120 in FIGS. 3A and 3B). However, that mobile terminal can still communicate with the public network 100 via the public macro-cells (e.g., cell 112 or 122).

In implementing the inventive concept of limiting access to subscribers of private radio networks in other cellular systems, such as, for example, the GSM, the method described above with respect to FIGS. 2 and 3 can also apply to mobile terminals operating in the active mode. For example, a mobile terminal belonging to a subscriber of a private network located in the coverage area of a GSM public network receives information about the private cells over the GSM network's Dedicated Control Channels (DCCH), such as the Stand-alone Dedicated Control Channel (SDCCH), Slow Associated Control Channel (SACCH), or Fast Associated Control Channel (FACCH). The private network transceivers broadcast system information about the candidate private cells and public cells to the subscribing mobile terminal via the private cell.

Furthermore, although the present method of limiting access to subscribers of private networks has been described above with respect to operating in exemplary GPRS or GSM public network environments, the invention is not intended to be so limited, and it can also be implemented with respect to any appropriate cellular radio system, such as, for example, the Advanced Mobile Phone System (AMPS), Digital Advanced Mobile Phone System (D-AMPS), cellular systems operating under the IS-95 protocol, Pacific Digital Cellular (PDC) System, etc.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for limiting access to a private network coupled to a public cellular network, comprising the steps of:

transmitting public cell information about said public cellular network on a public system information channel, said public cell information excluding private network cell information, in response to a signal received from a subscribing mobile terminal, said public cellular network transmitting a message for said subscribing mobile terminal, said message including cell selection candidate information for at least one cell associated with said private network; and said private network transmitting neighboring cell information for said subscribing mobile terminal via said at least one cell associated with said private network.

2. The method of claim 1, wherein said public system information channel comprises a broadcast control channel.

3. The method of claim 1, wherein said public system information channel comprises a packet broadcast control channel.

4. The method of claim 1, wherein said public system information channel comprises a dedicated control channel.

5. The method of claim 1, wherein said public system information channel comprises an associated control channel.

6. The method of claim 1, wherein said signal received from a subscribing mobile terminal comprises a cell update message.

7. The method of claim 1, wherein said signal received from a subscribing mobile terminal comprises a cell transfer initiation message.

8. The method of claim 1, wherein said at least one cell associated with said private network comprises a micro-cell.

9. The method of claim 1, wherein said at least one cell associated with said private network comprises a pico-cell.

10. The method of claim 1, further comprising the steps of:

said subscribing mobile terminal receiving said message including said cell selection candidate information and said neighboring cell information, and selecting at least one cell for communications from said cell selection candidate information or said neighboring cell information.

11. A system for limiting access to a private network coupled to a public cellular communications network, comprising:

first transmitting means for transmitting public cell information about said public cellular communications network on a public system information channel, said public cell information excluding private network cell information;

receiving means for receiving a signal from a subscribing mobile terminal;

second transmitting means responsive to said signal from said subscribing mobile terminal, for transmitting a message for said subscribing mobile terminal, said message including cell selection candidate information for at least one cell associated with said private network; and third transmitting means coupled to said private network for transmitting neighboring cell information for said subscribing mobile terminal via said at least one cell associated with said private network.

12. The system of claim 11, wherein said public system information channel comprises a broadcast control channel.

13. The system of claim 11, wherein said public system information channel comprises a packet broadcast control channel.

14. The system of claim 11, wherein said public system information channel comprises a dedicated control channel.

15. The system of claim 11, wherein said public system information channel comprises an associated control channel.

16. The system of claim 11, wherein said signal from a subscribing mobile terminal comprises a cell update message.

17. The system of claim 11, wherein said signal from a subscribing mobile terminal comprises a cell transfer initiation message.

18. The system of claim 11, wherein said at least one cell associated with said private network comprises a micro-cell.

19. The system of claim 11, wherein said at least one cell associated with said private network comprises a pico-cell.

20. The system of claim 11, wherein said public cellular communications network comprises a GPRS network.

21. The system of claim 11, wherein said public cellular communications network comprises a GSM network.

22. The system of claim 11, wherein said The system of claim 11, wherein said public cellular communications network comprises an AMPS network.

23. The system of claim 11, wherein said public cellular communications network comprises a D-AMPS network.

24. The system of claim 11, wherein said public cellular communications network comprises an IS-95 network.

25. The system of claim 11, wherein said public cellular communications network comprises a satellite-based cellular network.

26. A method for integrating a private network with a public cellular network and limiting access to the private network to only a subscribing mobile terminal of the private network, said method comprising the steps of:

transmitting public cell information about said public cellular network to the subscribing mobile terminal and a non-subscribing mobile terminal, said public cell information excluding private network cell information;

receiving a signal from the subscribing mobile terminal;

in response to receiving the signal from the subscribing mobile terminal, transmitting private network cell information to the subscribing mobile terminal so that the subscribing mobile terminal can consider both a private network cell and a public network cell for cell re-selection whereas from a viewpoint of the non-subscribing mobile terminal the private network cell does not exist for cell re-selection.

27. A system capable of integrating a private network with a public cellular network and limiting access to the private network to only a subscribing mobile terminal of the private network, said system comprising:

a transceiver for transmitting public cell information about said public cellular network to the subscribing mobile terminal and a non-subscribing mobile terminal, said public cell information excluding private network cell information;

a receiver for receiving a signal from the subscribing mobile terminal;

in response to receiving the signal from the subscribing mobile terminal, said transceiver for transmitting private network cell information to the subscribing mobile terminal so that the subscribing mobile terminal can consider both a private network cell and a public network cell for cell re-selection whereas from a viewpoint of the non-subscribing mobile terminal the private network cell does not exist for cell re-selection.

* * * * *